(12) United States Patent
Shigeta et al.

(10) Patent No.: US 8,229,640 B2
(45) Date of Patent: Jul. 24, 2012

(54) DRIVE FORCE TRANSMISSION APPARATUS, CONTROL METHOD OF DRIVE FORCE TRANSMISSION APPARATUS, AND LIMITED SLIP DIFFERENTIAL

(75) Inventors: Ryouhei Shigeta, Anjo (JP); Akihiro Ohno, Okazaki (JP); Hiroyuki Ando, Novi, MI (US); Masaki Mita, Chiryu (JP); Tomohiro Nozu, Anjo (JP)

(73) Assignee: JTEKT Corporation, Osaka-shi (JP)

( * ) Notice: Subject to any disclaimer, the term of this patent is extended or adjusted under 35 U.S.C. 154(b) by 621 days.

(21) Appl. No.: 12/408,851

(22) Filed: Mar. 23, 2009

(65) Prior Publication Data
US 2009/0248268 A1 Oct. 1, 2009

(30) Foreign Application Priority Data
Mar. 31, 2008 (JP) ................................. 2008-091291

(51) Int. Cl.
*B60T 8/24* (2006.01)
*G05D 3/00* (2006.01)
(52) U.S. Cl. ................ 701/72; 701/41; 701/48; 701/69; 701/74; 701/75; 701/82; 701/84
(58) Field of Classification Search .................. None
See application file for complete search history.

(56) References Cited

U.S. PATENT DOCUMENTS

| | | | |
|---|---|---|---|
| 4,840,246 A | 6/1989 | Yamakawa et al. | |
| 5,819,194 A * | 10/1998 | Hara et al. | 701/89 |
| 6,189,642 B1 | 2/2001 | Kusano | |
| 6,823,252 B2 * | 11/2004 | Ito et al. | 701/82 |
| 7,127,343 B2 * | 10/2006 | Nagura et al. | 701/89 |
| 7,151,991 B2 * | 12/2006 | Iida | 701/69 |
| 7,258,185 B2 * | 8/2007 | Ohno et al. | 180/197 |
| 7,374,255 B2 * | 5/2008 | Mori | 303/190 |
| 2002/0003057 A1 | 1/2002 | Mori et al. | |
| 2007/0029126 A1 | 2/2007 | Shigeta et al. | |
| 2007/0032339 A1 | 2/2007 | Shigeta et al. | |

FOREIGN PATENT DOCUMENTS

| | | |
|---|---|---|
| EP | 1 127 726 A2 | 8/2001 |
| JP | 62-074718 | 4/1987 |
| JP | 8-2278 | 1/1996 |
| JP | 2003-312289 | 11/2003 |
| WO | WO 03/091056 | 11/2003 |

OTHER PUBLICATIONS

U.S. Appl. No. 12/603,867, filed Oct. 22, 2009, Mita, et al.
Japanese Office Action dated Apr. 3, 2012 for JP Application 2008-091291, filed Mar. 31, 2008, 2 pages.

* cited by examiner

*Primary Examiner* — Khoi Tran
*Assistant Examiner* — Bao Long T Nguyen
(74) *Attorney, Agent, or Firm* — Oblon, Spivak, McClelland, Maier & Neustadt, L.L.P.

(57) ABSTRACT

When determining that a vehicle is not skidding, the ECU carries out tight corner control if vehicle speed is smaller than the upper limit value of the vehicle speed range corresponding to the starting state of the vehicle and the steering wheel turning angle of a steering wheel is greater than or equal to the minimum value of the steering wheel turning angle at which the tight corner braking phenomenon may occur. When determining that the vehicle is skidding, the ECU inhibits the tight corner control even if the vehicle speed is smaller than the upper limit value and the steering wheel turning angle is greater than or equal to the minimum value of the steering wheel turning angle at which the tight corner braking phenomenon may occur.

7 Claims, 6 Drawing Sheets

DRIVE FORCE TRANSMISSION APPARATUS, CONTROL METHOD OF DRIVE FORCE TRANSMISSION APPARATUS, AND LIMITED SLIP DIFFERENTIAL

BACKGROUND OF THE INVENTION

The present invention relates to a drive force transmission apparatus including a torque coupling capable of changing the ratio of torque of a drive source distributed to the main drive wheels and the auxiliary drive wheels of a four-wheel-drive vehicle, a control method of the drive force transmission apparatus, a torque distribution mechanism that distributes torque of a drive source to front wheels and rear wheels, and a limited slip differential having a differential limiting mechanism capable of limiting differential motion between the front and rear wheels.

A four-wheel-drive vehicle having main drive wheels and auxiliary drive wheels are known. The main drive wheels constantly receive torque of a drive source, while the auxiliary drive wheels receive the torque when necessary according to the state of the vehicle. A drive force transmission apparatus is provided between the drive source and the auxiliary drive wheels of the four-wheel-drive vehicle. The drive force transmission apparatus includes a torque coupling capable of changing the torque transmitted to the auxiliary drive wheels (hereinafter, referred to as torque transmission capacity).

When the vehicle turns, the turning radius of the front wheels is greater than the turning radius of the rear wheels. As the turning radius of the vehicle becomes smaller, the difference between the turning radius of the front wheels and the turning radius of the rear wheels, or, the rotation difference between the front wheels and the rear wheels, becomes greater. Accordingly, if the torque transmission capacity is set to a great value when the four-wheel-drive vehicle including the aforementioned drive force transmission apparatus turns at a small turning radius, the rotation difference between the front wheels and the rear wheels cannot be absorbed. In this case, a tight corner braking phenomenon, in which the front and rear wheels act as if they were braked, may occur.

To suppress such disadvantage, a control device described in, for example, Japanese Laid-Open Patent Publication No. 8-2278 may be employed. The control device calculates the turning radius of a vehicle based on the difference between the rotational speed of the outer front wheel and the rotational speed of the inner rear wheel. If the obtained turning radius is greater than or equal to a predetermined reference value, the control device sets the torque transmission capacity to a small value. The reference value is set to the maximum value of the turning radius (hereinafter, referred to as the "maximum radius") at which the tight corner braking phenomenon may occur. This suppresses the occurrence of the tight corner braking phenomenon.

When the vehicle is in a stopped state, the difference in the rotational speed between the wheels does not occur. Accordingly, a relatively long time elapses from when the vehicle starts to run to when the turning radius of the vehicle can be obtained based on the difference in the rotational speed between the wheels. As a result, for example, immediately after the steering wheel is turned fully to a steering end when the vehicle is in a stopped state and the vehicle starts to run, the fact that the turning radius is greater than the aforementioned reference value may not be detected. In this case, the aforementioned control in which the torque transmission capacity is set to a small value cannot be carried out. This possibly leads to the tight corner braking phenomenon.

The problem is not restricted to the case in which the steering wheel is fully turned when the vehicle is in a stopped state. For example, if the vehicle speed is lower than the upper limit value of the vehicle speed range corresponding to the starting state of the vehicle, the wheel speed sensors may not be capable of accurately detecting the rotational speeds of the corresponding wheels. If, in this case, the steering wheel is steered in such a manner that the turning radius of the vehicle becomes smaller than or equal to the aforementioned maximum radius, the above-described disadvantage can occur.

To suppress the disadvantage, the turning radius of the vehicle may be estimated based on the turning angle of the steering wheel when the vehicle starts. The torque transmission capacity is reduced if the estimated turning radius is smaller than or equal to the maximum radius. However, if the vehicle is started on a road surface with a low friction coefficient such as an icy road surface and the torque transmission capacity is reduced based on the steering wheel turning angle, as has been described, sufficient torque may not be transmitted to the auxiliary drive wheels despite the fact that the vehicle is skidding. This lowers the traction performance of the vehicle.

These problems occur not only with a drive force transmission apparatus having a torque coupling, but also with a torque distribution mechanism that distributes torque of a drive source to front wheels and rear wheels, and with a limited slip differential having a differential limiting mechanism capable of limiting differential motion between a first driveshaft connected to the front wheels and a second driveshaft connected to the rear wheels.

SUMMARY OF THE INVENTION

Accordingly, it is an objective of the present invention to provide a drive force transmission apparatus, a control method of the drive force transmission apparatus, and a limited slip differential that are capable of improving the traction performance of a vehicle on a road surface with a low friction coefficient while suppressing a tight corner braking phenomenon caused by steering the steering wheel when the speed of the vehicle is smaller than or equal to a speed corresponding to a starting state of the vehicle.

To achieve the foregoing objective and in accordance with a first aspect of the present invention, a drive force transmission apparatus employed in a four-wheel-drive vehicle having main drive wheels, to which torque of a drive source is constantly transmitted, and auxiliary drive wheels, to which the torque of the drive source is transmitted when needed according to the state of the vehicle, is provided. The apparatus includes a torque coupling that is arranged between the drive source and the auxiliary drive wheels and capable of changing the capacity of torque transmission to the auxiliary drive wheels, and a control device that controls operation of the torque coupling. The control device calculates a turning radius of the vehicle based on speeds of the wheels. If the calculated turning radius is smaller than or equal to a maximum value of a turning radius at which a tight corner braking phenomenon can occur, the control device performs tight corner control in which the torque transmission capacity is decreased compared to a case in which the turning radius of the vehicle is greater than the maximum value of the turning radius. When determining that the vehicle is not skidding based on the wheel speeds, the control device carries out the tight corner control if the speed of the vehicle is smaller than an upper limit value of a vehicle speed range corresponding to a starting state of the vehicle and a turning angle of a steering wheel is greater than or equal to a minimum value of a steering wheel turning angle at which the tight corner braking phenomenon can occur. When determining that the vehicle is skidding based on the wheel speeds, the control device inhibits the tight corner control even if the vehicle speed is smaller than the upper limit value and the steering wheel turning angle is greater than or equal to the minimum value of the steering wheel turning angle at which the tight corner braking phenomenon can occur.

In accordance with a second aspect of the present invention, a control method of a drive force transmission apparatus employed in a four-wheel-drive vehicle having main drive wheels, to which torque of a drive source is constantly transmitted, and auxiliary drive wheels, to which the torque of the drive source is transmitted when needed according to the state of the vehicle is provided. The apparatus includes a torque coupling that is arranged between the drive source and the auxiliary drive wheels and capable of changing the capacity of torque transmission to the auxiliary drive wheels, and a control device that controls operation of the torque coupling. The control device calculates a turning radius of the vehicle based on speeds of the wheels. If the calculated turning radius is smaller than or equal to a maximum value of a turning radius at which a tight corner braking phenomenon can occur, the control device performs tight corner control in which the torque transmission capacity is decreased compared to a case in which the turning radius of the vehicle is greater than the maximum value of the turning radius. When it is determined that the vehicle is not skidding based on the wheel speeds, the tight corner control is performed if the speed of the vehicle is smaller than an upper limit value of a vehicle speed range corresponding to a starting state of the vehicle and a turning angle of a steering wheel is greater than or equal to a minimum value of a steering wheel turning angle at which the tight corner braking phenomenon can occur. If it is determined that the vehicle is skidding based on the wheel speeds, the tight corner control is inhibited even if the vehicle speed is smaller than the upper limit value and the steering wheel turning angle is greater than or equal to the minimum value of the steering wheel turning angle at which the tight corner braking phenomenon can occur.

In accordance with a third aspect of the present invention, a limited slip differential including a torque distribution mechanism that distributes torque of a drive source of a four-wheel-drive vehicle to a first driveshaft connected to front wheels and a second driveshaft connected to rear wheels, a differential limiting mechanism capable of limiting differential motion between the first driveshaft and the second driveshaft, and a control device that controls operation of the differential limiting mechanism is provided. The control device calculates a turning radius of the vehicle based on speeds of the wheels. If the calculated turning radius is smaller than or equal to a maximum value of a turning radius at which a tight corner braking phenomenon may occur, the control device performs tight corner control in which a differential limiting force of the differential limiting mechanism is decreased compared to a case in which the turning radius of the vehicle is greater than the maximum value of the turning radius. When determining that the vehicle is not skidding based on the wheel speeds, the control device carries out the tight corner control if the speed of the vehicle is smaller than an upper limit value of a vehicle speed range corresponding to a starting state of the vehicle and a turning angle of a steering wheel is greater than or equal to a minimum value of a steering wheel turning angle at which the tight corner braking phenomenon can occur. When determining that the vehicle is skidding based on the wheel speeds, the control device inhibits the tight corner control even if the vehicle speed is smaller than the upper limit value and the steering wheel turning angle is greater than or equal to the minimum value of the steering wheel turning angle at which the tight corner braking phenomenon can occur.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

First Embodiment

A first embodiment of the present invention will now be described with reference to FIGS. 1 to 6.

Figure 1:
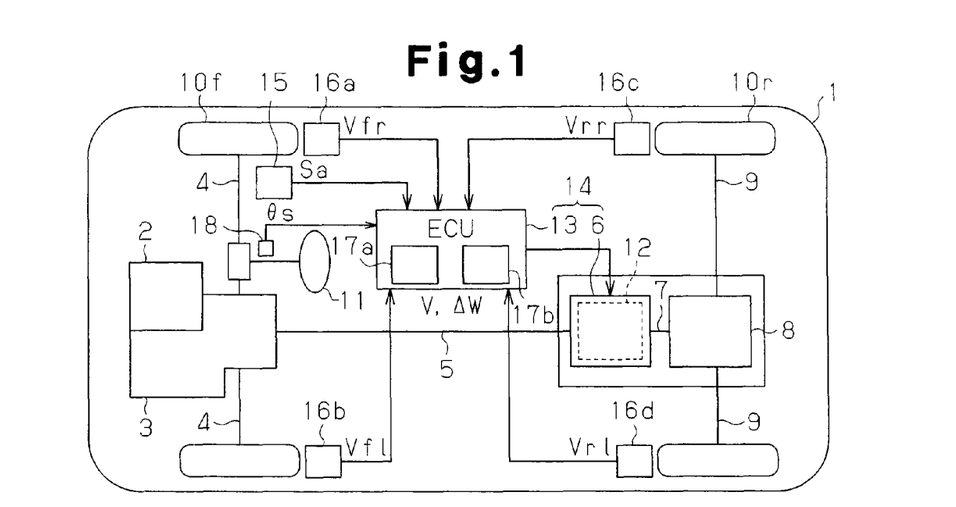
FIG. 1 is a diagram showing the construction of a four-wheel-drive vehicle having a drive force transmission apparatus.

As illustrated in FIG. 1, a vehicle 1 is a front wheel drive-based four-wheel-drive vehicle. An engine 2 functioning as a drive source is mounted in a front portion (in a left side as viewed in FIG. 1) of the vehicle 1. A transaxle 3 is incorporated in the engine 2. A pair of front axles 4 and a propeller shaft 5 are connected to the transaxle 3. A pair of front wheels 10f are provided for the corresponding front axles 4.

The propeller shaft 5 is connectable to a drive pinion shaft (hereinafter, referred to as a pinion shaft 7) through a torque coupling 6. The pinion shaft 7 is connected to a pair of rear axles 9 through a rear differential 8. A pair of rear wheels 10r are provided on the corresponding rear axles 9.

The torque of the engine 2 is transmitted to the transaxle 3, which divides the torque to two paths. Specifically, the torque of the engine 2 is transmitted to the front wheels 10f through the front axles 4 and the rear wheels 10r through the propeller shaft 5, the torque coupling 6, the pinion shaft 7, the rear differential 8, and the rear axles 9.

A steering wheel 11 is connected to the front axle 4. When the steering wheel 11 is turned, the tire angle of the front wheels 10f is changed so that the proceeding direction of the vehicle is altered.

An electromagnetic clutch 12 having an electromagnetic coil is arranged in the torque coupling 6. The frictional engagement force produced by the electromagnetic clutch 12 changes in correspondence with change of the amount of the current supplied to the electromagnetic coil. The torque coupling 6 is capable of changing the torque (hereinafter, referred to as torque transmission capacity) transmitted to the rear wheels 10r based on change of the friction engagement force of the electromagnetic clutch 12.

An ECU 13, which functions as a control device, is connected to the torque coupling 6. By changing a drive current fed to the electromagnetic clutch 12 in accordance with the traveling state of the vehicle, the ECU 13 controls operation of the torque coupling 6 and regulates the torque transmission capacity. The torque coupling 6 and the ECU 13 configure a drive force transmission apparatus 14.

An accelerator pedal position sensor 15 and wheel speed sensors 16a, 16b, 16c, 16d are connected to the ECU 13. The accelerator pedal position sensor 15 detects the depression amount of the accelerator pedal. The wheel speed sensors 16a to 16d each detect the rotational speed of the corresponding one of the wheels. Based on the wheel speeds Vfr, Vfl, Vrr, Vrl, which are detected by the corresponding wheel sensors 16a to 16d, the ECU 13 calculates the vehicle speed V and the difference (hereinafter, referred to as the wheel speed difference $\Delta W$) between the rotational speed of the front wheels 10f and the rotational speed of the rear wheels 10r. The ECU 13 calculates a control target value of the torque transmission capacity (hereinafter, referred to as a target torque) based on the vehicle speed V, the wheel speed difference $\Delta W$, and the accelerator pedal depression amount Sa.

Specifically, the ECU 13 has a normal map set 17a having a first normal map and a second normal map. When given a vehicle speed V and an accelerator pedal depression amount Sa, the first normal map provides a previously set target torque that corresponds to the vehicle speed V and the accelerator pedal depression amount Sa. According to the first normal map, the target torque becomes greater as the vehicle speed V becomes lower and/or as the accelerator pedal depression amount Sa becomes greater. When given a vehicle speed V and a wheel speed difference $\Delta W$, the second normal map provides a previously set target torque that corresponds to the vehicle speed V and the wheel speed difference $\Delta W$. According to the second normal map, the target torque becomes greater as the vehicle speed V becomes lower and the wheel speed difference $\Delta W$ becomes greater.

The ECU 13 sets a target torque by applying the vehicle speed V, the accelerator pedal depression amount Sa, and the wheel speed difference $\Delta W$, which have been detected, to the normal map set 17a. The ECU 13 feeds power to the electromagnetic clutch 12 in order to generate friction engagement force corresponding to the set target torque. In this manner, the operation of the torque coupling 6 is controlled, or, in other words, the ratio by which the torque is distributed to the front wheels 10f and the rear wheels 10r is regulated.

If the torque transmission capacity is set to a great value when the vehicle 1 having the drive force transmission apparatus 14 turns by a small turning radius, the rotation difference between the front and rear wheels cannot be absorbed. In this case, a tight corner braking phenomenon, in which the front wheels 10f and the rear wheels 10r act as they were braked, may occur. In this regard, if the turning radius of the vehicle 1 is smaller than or equal to the maximum value (hereinafter, referred to as a maximum radius) of the turning radius at which the tight corner braking phenomenon can occur, the ECU 13 carries out tight corner control in which the torque transmission capacity is reduced compared to a case in which the turning radius of the vehicle 1 is greater than the maximum radius.

Specifically, in addition to the normal map set 17a, the ECU 13 has a tight corner map set 17b having a first tight corner map and a second tight corner map. When given a vehicle speed V and an accelerator pedal depression amount Sa, the first tight corner map provides a target torque that corresponds to the vehicle speed V and the accelerator pedal depression amount Sa. According to the first tight corner map, the target torque becomes greater as the vehicle speed V becomes lower and as the accelerator pedal depression amount Sa becomes greater. When given a vehicle speed V and a wheel speed difference $\Delta W$, the second tight corner map provides a target torque that corresponds to the vehicle speed V and the wheel speed difference $\Delta W$. According to the second tight corner map, the target torque becomes greater as the vehicle speed V becomes lower and as the wheel speed difference $\Delta W$ becomes greater. When given the same vehicle speed V, the same accelerator pedal depression amount Sa, and the same wheel speed difference $\Delta W$, the tight corner map set 17b sets a smaller target torque than the normal map set 17a.

If the tight corner control is carried out, the target torque is set with reference to the tight corner map set 17b. In this manner, the torque transmitted to the rear wheels 10r decreases and the tight corner braking phenomenon is suppressed. In contrast to the tight corner control, a control mode in which the target torque is set with reference to the normal map set 17a is referred to as normal control.

Switching of control modes by the ECU 13 will hereafter be explained in detail.

The ECU 13 calculates the turning radius of the vehicle 1 based on the wheel speeds Vfr, Vfl, Vrr, Vrl and then determines whether the calculated turning radius is smaller than or equal to the aforementioned maximum radius. If the turning radius is smaller than or equal to the maximum radius, the tight corner control is executed.

The steering wheel 11 is provided with a steering sensor 18. The steering wheel turning angle $\theta s$ detected by the steering sensor 18 is input to the ECU 13. It is then determined whether the detected steering wheel turning angle $\theta s$ is greater than or equal to a steering wheel turning angle at which the turning radius of the vehicle 1 is the maximum radius (hereinafter, referred to as a reference steering wheel turning angle $\theta s1$). In other words, it is determined whether the steering wheel turning angle $\theta s$ is greater than or equal to the minimum value of the steering wheel turning angle at which the tight corner braking phenomenon can occur.

If the vehicle speed V is smaller than the upper limit value V1 of the vehicle speed range corresponding to the starting state of the vehicle 1, the tight corner control is carried out only based on determination regarding to the steering wheel turning angle $\theta s$. The upper limit value V1 corresponds to the minimum value of the wheel speed that can be accurately detected by each wheel speed sensor 16a to 16d when the vehicle 1 is decelerated. The upper limit value V1 is set to 0.8 km/h in the first embodiment.

In the first embodiment, it is determined that the vehicle speed V is smaller than the upper limit value V1 if all the wheel speeds Vfr, Vfl, Vrr, Vrl are smaller than the upper limit value V1.

The ECU 13 determines whether the vehicle 1 is skidding using output signals of the wheel speed sensors 16a to 16d. If it is determined that the vehicle 1 is skidding, switching to the tight corner control is inhibited even if the vehicle speed V is smaller than the upper limit value V1 and the steering wheel turning angle $\theta s$ is greater than or equal to the reference steering wheel turning angle $\theta s1$.

The ECU 13 determines whether the engine was started only a moment ago, that is, whether the ignition switch was turned on only a moment ago (hereinafter, referred to as a state immediately after IG ON). If it is determined that the current state is the state immediately after IG ON, the tight corner control is performed.

Figure 2:
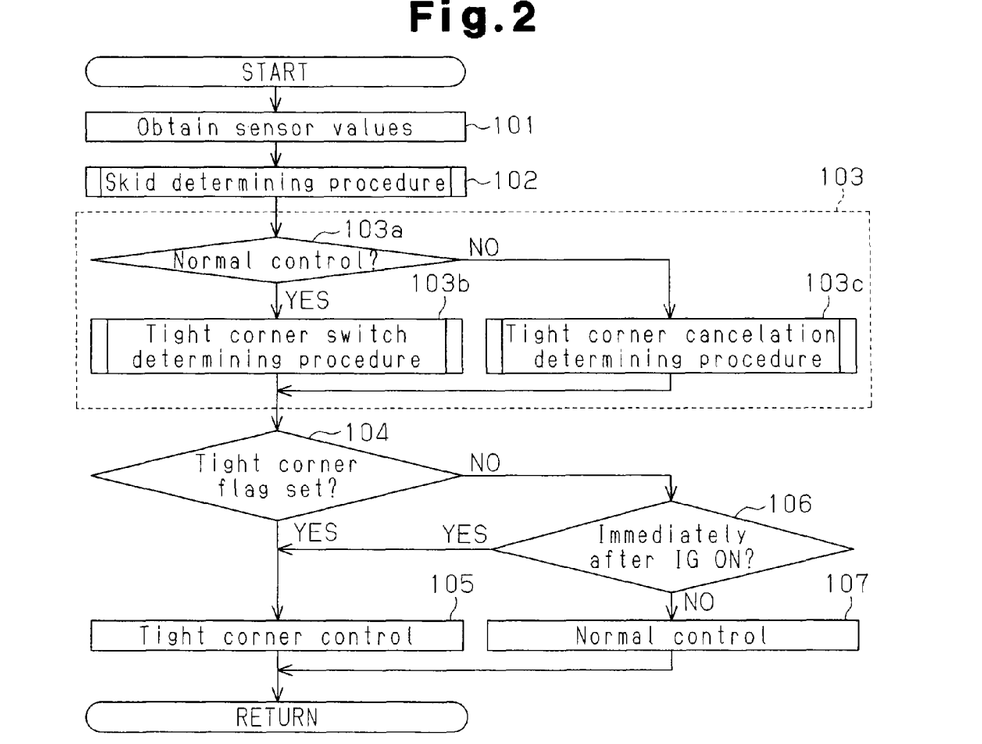
FIG. 2 is a flowchart representing a control mode switching procedure.

A control mode switching procedure executed by the ECU 13 will hereafter be explained in further detail with reference to the flowchart of FIG. 2. In the flowchart, the steps corresponding to respective ones of the procedure contents will be indicated by numerals following S.

First, the sensor values detected by the respective ones of the aforementioned sensors are acquired by the ECU 13 as the vehicle state quantities (S101). After determination on the skid state of the vehicle 1 is carried out (S102), the ECU 13 determines whether to switch control modes (S103).

Subsequently, it is determined whether a tight corner flag indicating that the control mode is to be switched to the tight corner control has been set (S104). The tight corner flag is set in S103. If the tight corner flag has been set (S104: YES), the control mode is switched to the tight corner control (S105). If the tight corner flag has not been set (S104: NO), it is determined whether the current state corresponds to the state immediately after IG ON (S106). If it is determined that the current state corresponds to the state immediately after IG ON (S106: YES), the control mode is switched to the tight corner control (S105). If it is determined that the current state does not correspond to the state immediately after IG ON (S106: NO), the control mode is switched to the normal mode (S107).

In the aforementioned step S103, it is first determined whether the control mode is the normal control (S103a). If it is determined that the control mode is the normal control (S103a: YES), it is determined whether to switch the normal control mode to the tight corner control (S103b). If it is determined that the control mode is not the normal control (S103: NO), it is determined whether to cancel the tight corner control (S103c).

A skid state determining procedure of the vehicle 1 in the aforementioned step S102 will now be described.

If at least one of the right front wheel speed Vfr and the left front wheel speed Vfl is greater than or equal to a second reference wheel speed V2 and at least one of the right rear wheel speed Vrr and the left rear wheel speed Vrl is smaller than a third reference wheel speed V3, it is determined that the vehicle 1 is skidding. In the first embodiment, the second reference wheel speed V2 is set to 4 km/h, and the third reference wheel speed V3 is set to 2 km/h.

If at least one of the front wheel speeds Vfr, Vfl is greater than or equal to a fourth reference wheel speed V4 and the rear wheel speeds Vrr, Vrl are smaller than a fifth reference wheel speed V5, it is also determined that the vehicle 1 is skidding. If the vehicle 1 is skidding, a tire angle determination inhibiting flag (hereinafter, referred to as an inhibiting flag) is set. The inhibiting flag indicates that switching the control mode to the tight corner control based only on the steering wheel turning angle θs is inhibited.

If the inhibiting flag is set, that is, if it is determined that the vehicle 1 is skidding, it is determined whether the wheel speeds Vfr, Vfl, Vrr, Vrl have been continuously greater than or equal to a sixth reference wheel speed V6 for a predetermined period T1. In the first embodiment, the sixth reference wheel speed V6 is set to 2 km/h. If the wheel speeds Vfr, Vfl, Vrr, Vrl all have been continuously greater than or equal to the sixth reference wheel speed V6 for the predetermined period T1, the inhibiting flag is cleared.

Figure 3:
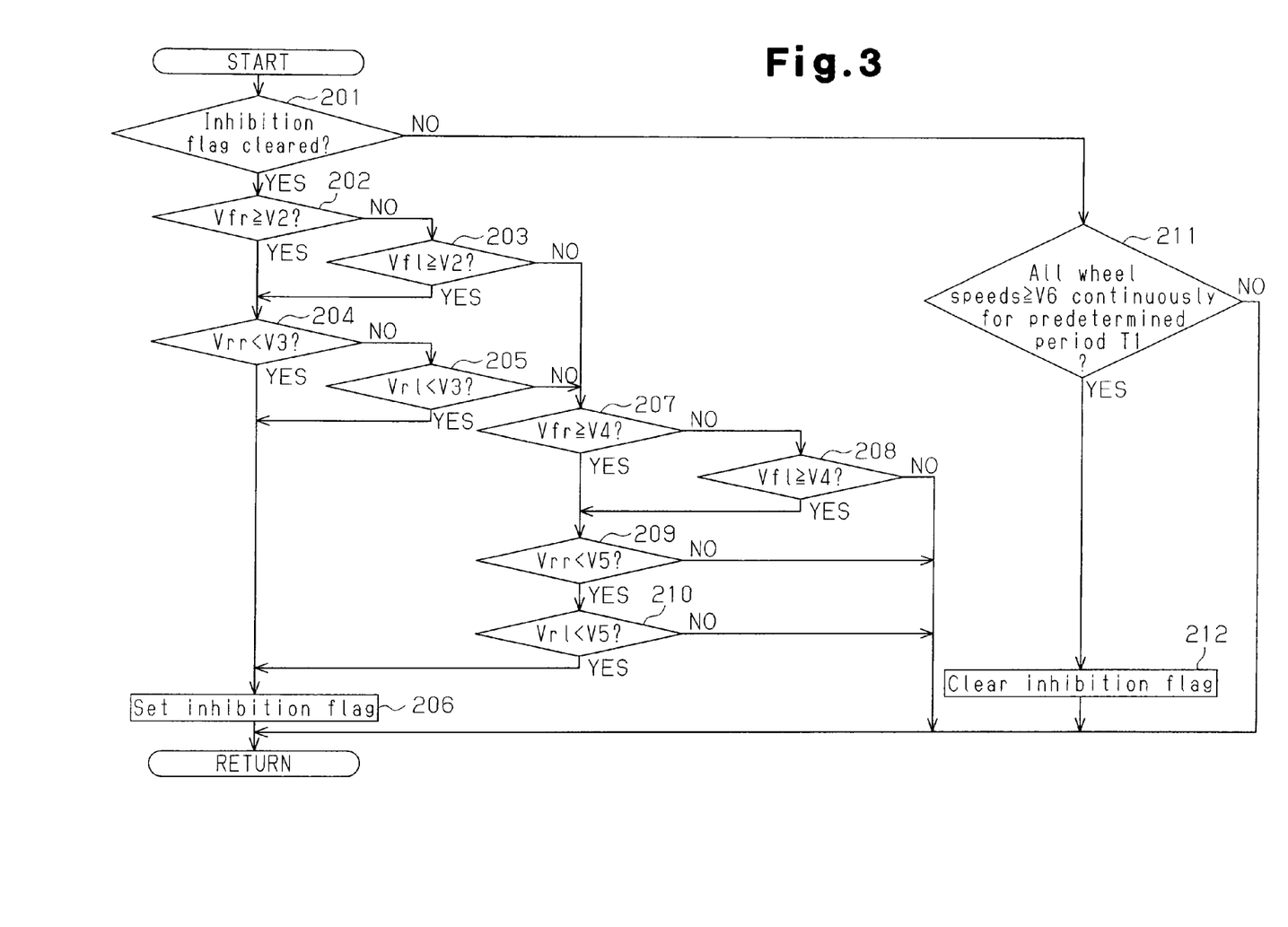
FIG. 3 is a flowchart representing a skid determining procedure.

The skid state determining procedure, which has been described, will be explained in detail with reference to the flowchart of FIG. 3.

First, it is determined whether the inhibiting flag has been cleared (S201). If the inhibiting flag has been cleared (S201: YES), it is determined whether the right front wheel speed Vfr is greater than or equal to the second reference wheel speed V2 (S202). If the right front wheel speed Vfr is smaller than the second reference wheel speed V2 (S202: NO), it is determined whether the left front wheel speed Vfl is greater than or equal to the second reference wheel speed V2 (S203).

If the right front wheel speed Vfr is greater than or equal to the second reference wheel speed V2 (S202: YES) or if the left front wheel speed Vfl is greater than or equal to the second reference wheel speed V2 (S203: YES), it is determined whether the right rear wheel speed Vrr is smaller than the third reference wheel speed V3 (S204).

If the right rear wheel speed Vrr is greater than or equal to the third reference wheel speed V3 (S204: NO), it is determined whether the left rear wheel speed Vrl is smaller than the third reference wheel speed V3 (S205). If the right rear wheel speed Vrr is smaller than the third reference wheel speed V3 (S204: YES) or if the left rear wheel speed Vrl is smaller than the third reference wheel speed V3 (S205: YES), the inhibiting flag is set (S206).

If the left front wheel speed Vfl is smaller than the second reference wheel speed V2 (S203: NO) or if the left rear wheel speed Vrl is greater than or equal to the third reference wheel speed V3 (S205: NO), it is determined whether the right front wheel speed Vfr is greater than or equal to the fourth reference wheel speed V4 (S207). If it is determined that the right front wheel speed Vfr is smaller than the fourth reference wheel speed V4 (S207: NO), it is determined whether the left front wheel speed Vfl is greater than or equal to the fourth reference wheel speed V4 (S208).

If the right front wheel speed Vfr is greater than or equal to the fourth reference wheel speed V4 (S207: YES) or if the left front wheel speed Vfl is greater than or equal to the fourth reference wheel speed V4 (S208: YES), it is determined whether the right rear wheel speed Vrr is smaller than the fifth reference wheel speed V5 (S209). If it is determined that the left front wheel speed Vfl is smaller than the fourth reference wheel speed V4 (S208: NO), the skid determining procedure is ended without setting the inhibiting flag.

If it is determined that the right rear wheel speed Vrr is smaller than the fifth reference wheel speed V5 (S209: YES), it is determined whether the left rear wheel speed Vrl is smaller than the fifth reference wheel speed V5 (S210). If the right rear wheel speed Vrr is greater than or equal to the fifth reference wheel speed V5 (S209: NO), the skid determining procedure is ended without setting the inhibiting flag.

If it is determined that the left rear wheel speed Vrl is smaller than the fifth reference wheel speed V5 (S210: YES), step S206 is carried out and the inhibiting flag is set. If the left rear wheel speed Vrl is greater than or equal to the fifth reference wheel speed V5 (S210: NO), the skid determining procedure is ended without setting the inhibiting flag.

If it is determined that the inhibiting flag has been set (S201: NO), it is determined whether the wheel speeds Vfr, Vfl, Vrr, Vrl have been continuously greater than or equal to the sixth reference wheel speed V6 for the predetermined period T1 (S211). Specifically, the time since the wheel speeds Vfr, Vfl, Vrr, Vrl have become greater than or equal to the sixth reference wheel speed V6 is measured by the ECU 13. The determination of S211 is carried out based on the measurement.

If it is determined that the wheel speeds Vfr, Vfl, Vrr, Vrl have been continuously greater than or equal to the sixth reference wheel speed V6 for the predetermined period T1 (S211: YES), the inhibiting flag is cleared (S212). If it is determined that the state in which all of the wheel speeds Vfr, Vfl, Vrr, Vrl are greater than or equal to the sixth reference wheel speed V6 has not continued for the predetermined period T1 (S211: NO), the skid determining procedure is ended without clearing the inhibiting flag.

The aforementioned determination of whether to switch to the tight corner control in step S103*b* will be now explained.

If at least one of the wheel speeds Vfr, Vfl, Vrr, Vrl is greater than the aforementioned upper limit value V1, it is determined whether the vehicle 1 is turning by a turning radius smaller than or equal to the aforementioned maximum radius. If the vehicle 1 is turning by a turning radius smaller than or equal to the aforementioned maximum radius, a switch flag indicating the control mode is to be switched to the tight corner control is set.

If the wheel speeds Vfr, Vfl, Vrr, Vrl are all smaller than the upper limit value V1 and the vehicle 1 is not skidding, the determination of whether to switch to the tight corner control is carried out based only on the steering wheel turning angle θs. Specifically, if the steering wheel turning angle θs is greater than or equal to the aforementioned reference steering wheel turning angle θs1, the switch flag is set. If the vehicle 1 is skidding, the tight corner flag is not set even if the wheel speeds Vfr, Vfl, Vrr, Vrl are all smaller than the upper limit value V1 and the steering wheel turning angle θs is greater than or equal to the reference steering wheel turning angle θs1.

Figure 4:
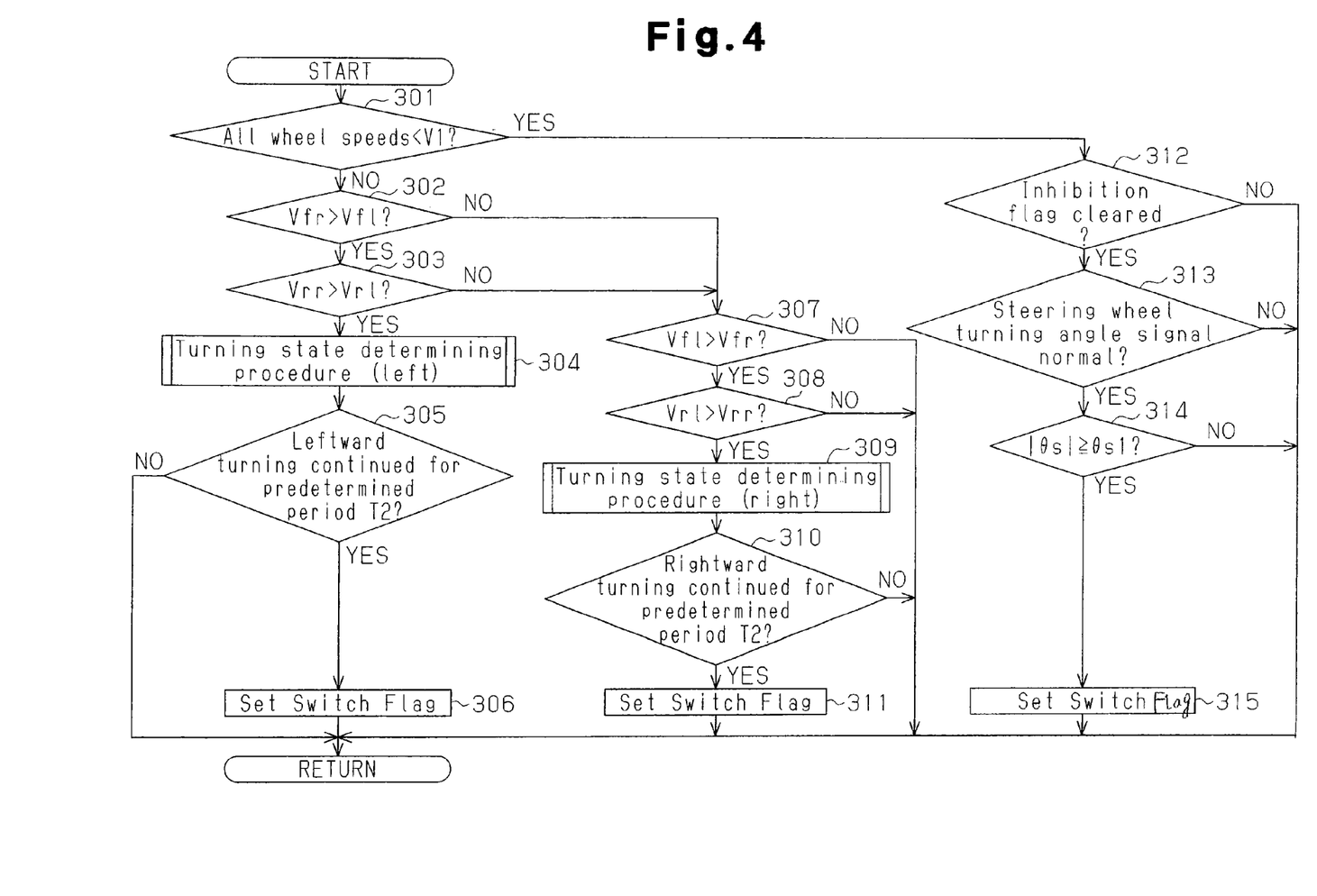
FIG. 4 is a flowchart representing a determining procedure for determining whether to switch to tight corner control.

The switch determining procedure, which has been described, will be explained in detail with reference to the flowchart of FIG. 4.

First, it is determined whether the wheel speeds Vfr, Vfl, Vrr, Vrl are all smaller than the upper limit value V1 (S301). If at least one of the wheel speeds Vfr, Vfl, Vrr, Vrl is greater than or equal to the upper limit value V1 (S301: NO), it is determined whether the vehicle 1 is turning to the left.

Specifically, it is determined whether the right front wheel speed Vfr is greater than the left front wheel speed Vfl (S302). If the right front wheel speed Vfr is greater than the left front wheel speed Vfl (S302: YES), it is determined whether the right rear wheel speed Vrr is greater than the left rear wheel speed Vrl (S303). If the right rear wheel speed Vrr is greater than the left rear wheel speed Vrl (S303: YES), it is determined that the vehicle 1 is turning to the left. It is then determined whether the vehicle 1 is turning by a turning radius that requires the tight corner control (hereinafter, referred to as a control radius) (S304).

Subsequently, it is determined whether the vehicle 1 has been continuously turning to the left (hereinafter, referred to as a leftward turning state) by the control radius for a predetermined period T2 (S305). If the leftward turning state has continued for the predetermined period T2 (S305: YES), the switch flag is set (S306). If the leftward turning state has not continued for the predetermined period T2 (S305: NO), the switch determining procedure is ended without setting the switch flag. In the first embodiment, the time in which the leftward turning state lasts is measured by the ECU 13. The determination of S305 is thus carried out based on the measurement.

If the right front wheel speed Vfr is smaller than or equal to the left front wheel speed Vfl (S302: NO) or if the right rear wheel Vrr is smaller than or equal to the left rear wheel speed Vrl (S303: NO), it is determined whether the vehicle 1 is turning to the right. Specifically, it is determined whether the left front wheel speed Vfl is greater than the right front wheel speed Vfr (S307). If the left front wheel speed Vfl is greater than the right front wheel speed Vfr (S307: YES), it is determined whether the left rear wheel speed Vrl is greater than the right rear wheel speed Vrr (S308). If the left rear wheel speed Vrl is greater than the right rear wheel speed Vrr (S308: YES), it is determined that the vehicle 1 is turning to the right. It is then determined whether the vehicle 1 is turning to the right by the control radius (S309).

Subsequently, it is determined whether the vehicle 1 has been continuously turning to the right (hereinafter, referred to as a rightward turning state) by the control radius for the predetermined period T2 (S310). If the rightward turning state has continued for the predetermined period T2 (S310: YES), the switch flag is set (S311). If the rightward turning state has not continued for the predetermined period T2 (S310: NO), the switch determining procedure is ended without setting the switch flag. In the first embodiment, the time in which the rightward turning state lasts is measured by the ECU 13, as in the case of the leftward turning. The determination of S310 is thus performed based on the measurement.

If the left front wheel speed Vfl is smaller than or equal to the right front wheel speed Vfr (S307: NO) or if the left rear wheel speed Vrl is smaller than or equal to the right rear wheel speed Vrr (S308: NO), it is presumed that the vehicle 1 is proceeding linearly. In this case, the switch determining procedure is ended without setting the switch flag.

If the wheel speeds Vfr, Vfl, Vrr, Vrl are all smaller than the upper limit value V1 (S301: YES), it is determined whether the inhibiting flag has been cleared (S312). If the inhibiting flag has been cleared (S312: YES), it is determined whether a steering wheel turning angle signal provided by the steering sensor 18 is normal (S313). If the inhibiting flag is set (S312: NO), the switch determining procedure is ended without setting the switch flag.

If the steering wheel turning angle signal is normal (S313: YES), it is determined whether the absolute value of the steering wheel turning angle θs is greater than or equal to the first reference steering wheel turning angle θs1 (S314). If the steering wheel turning angle signal is not normal (S313: NO), the switch determining procedure is ended without setting the switch flag.

If the steering wheel turning angle θs is greater than or equal to the first reference steering wheel turning angle θs1 (S314: YES), the switch flag is set (S315) and the switch determining procedure is ended. If the steering wheel turning angle θs is smaller than the first reference steering wheel turning angle θs1 (S314: NO), the switch determining procedure is ended without setting the switch flag.

Next, determination of whether the vehicle 1 is turning to the left by the control radius will be described.

If the turning radius of the left front wheel and the turning radius of the left rear wheel are both smaller than or equal to the control radius, it is determined that the vehicle 1 is turning to the left by the control radius. To simplify calculation, the turning radius of the vehicle depending on which determination is carried out is calculated using the value obtained by dividing the turning radius of the left front wheel by the equivalent front tread and the value obtained by dividing the turning radius of the left rear wheel by the rear tread.

In addition to the determination based on the turning radius of the vehicle 1, it is determined whether the steering wheel turning angle θs is greater than or equal to a second reference steering wheel turning angle θs2. If the steering wheel turning angle θs is greater than or equal to the second reference steering wheel turning angle θs2, it is determined that the vehicle is turning. In the first embodiment, the second reference steering wheel turning angle θs2 is set to the value equal to the first reference steering wheel turning angle θs1.

It is determined whether the vehicle 1 is skidding. If it is determined that the vehicle 1 is skidding, the determination that the vehicle 1 is turning by the control radius is not made.

It is determined whether the vehicle 1 is running at a speed lower than a seventh reference wheel speed V7. If the speed of the vehicle 1 is greater than or equal to the seventh reference wheel speed V7, the determination that the vehicle 1 is turning by the control radius is not made. The seventh reference wheel speed V7 represents a vehicle speed at which the vehicle 1 may skid due to decrease of the torque transmitted to the rear wheels 10r when the vehicle 1 turns by a predetermined turning radius.

The procedure to determine whether the vehicle 1 is turning to the left by the control radius will be explained in detail with reference to the flowchart of FIG. 5.

First, it is determined whether the turning radius of the left front wheel Rfl is greater than or equal to the minimum turning radius Rfmin and smaller than or equal to the reference turning radius Rfth (S401). If the turning radius Rfl is greater than or equal to the minimum turning radius Rfmin and smaller than or equal to the reference turning radius Rfth (S401: YES), it is determined whether the turning radius of the left rear wheel Rrl is greater than or equal to the minimum turning radius Rrmin and smaller than or equal to the reference turning radius Rrth (S402).

If the turning radius Rrl is greater than or equal to the minimum turning radius Rrmin and smaller than or equal to the reference turning radius Rrth (S402: YES), it is determined whether the steering wheel turning angle signal is normal (S403). If the steering wheel turning angle signal is normal (S403: YES), it is determined whether the steering wheel turning angle θs (a value in the leftward steering direction is represented by a positive value) is greater than or equal to the second reference steering wheel turning angle θs2 (S404). If the steering wheel turning angle θs is greater than or equal to the second reference steering wheel turning angle θs2 (S404: YES) or if the steering wheel turning angle signal is not normal (S403: NO), it is determined whether the vehicle 1 is skidding.

Specifically, it is determined whether the absolute value of the difference between the turning radius Rfl and the turning radius Rrl is smaller than or equal to a threshold value α (S405). If the difference is smaller than or equal to the threshold value α (S405: YES), it is determined whether the difference between the right rear wheel speed Vrr and the right front wheel speed Vfr is smaller than a threshold value β (S406). If the difference is smaller than the threshold value β (S406: YES), it is determined whether the difference between the left rear wheel speed Vrl and the left front wheel speed Vfl is smaller than the threshold value β (S407).

If the absolute value of the difference between the turning radius Rfl and the turning radius Rrl is greater than the threshold value α, it is determined that the vehicle 1 is skidding. If the difference between the right rear wheel speed Vrr and the right front wheel speed Vfr is greater than or equal to the threshold value β or if the difference between the left rear wheel speed Vrl and the left front wheel speed Vfl is greater than or equal to the threshold value β, it is determined that the vehicle 1 is skidding.

If the difference between the left rear wheel speed Vrl and the left front wheel speed Vfl is smaller than the threshold value β (S407: YES), it is determined whether the vehicle 1 is running at a speed lower than the seventh reference wheel speed V7. Specifically, it is determined whether the right rear wheel speed Vrr is smaller than the seventh reference wheel speed V7 (S408). If the right rear wheel speed Vrr is smaller than the seventh reference wheel speed V7 (S408: YES), it is determined whether the left rear wheel speed Vrl is smaller than the seventh reference wheel speed V7 (S409). If the left rear wheel speed Vrl is smaller than the seventh reference wheel speed V7 (S409: YES), it is determined that the vehicle 1 is in the leftward turning state, which has been explained above, and that the current running state of the vehicle 1 is the left turning state requiring the tight corner control (S410).

If the above-described conditions for determination in steps S401, S402, and S404 to S409 are not met (S401, S402, S404 to S409: NO), it is determined that the running state of the vehicle 1 does not correspond to the leftward turning state requiring the tight corner control (S411).

Determination about the rightward turning state is different from determination about the leftward turning state only in the following point. Specifically, the turning radius Rfr of the right front wheel and the turning radius of the right rear wheel Rrr are used instead of the turning radius Rfl of the left front wheel and the turning radius of the left rear wheel Rrl, respectively, in steps S401, S402, and S405. In step S404, it is determined whether the steering wheel turning angle θs (an angle in the rightward steering direction is represented by a positive value) is greater than or equal to a third reference steering wheel turning angle θs3. In the first embodiment, the third reference steering wheel turning angle θs3 is set to the value equal to the first reference steering wheel turning angle θs1. Detailed description of the determination about the rightward turning state will be omitted.

In the following, determination of whether the tight corner control should be canceled in step S103c, which has been described above, will be explained.

If the vehicle 1 is not turning at a turning radius smaller than or equal to the aforementioned maximum radius and that the wheel speeds Vfr, Vfl, Vrl, Vrr are greater than or equal to the first reference wheel speed VH1, the switch flag is cleared. Generally, the wheel speed that is detectable by the wheel speed sensors 16a to 16d and produces a small calculation error when the vehicle 1 accelerates is different from that when the vehicle 1 decelerates. Accordingly, in the first embodiment, when the vehicle 1 is accelerating, the switch flag is cleared if the wheel speeds Vfr, Vfl, Vrr, Vrl are greater than or equal to an acceleration upper limit value V1a (the minimum value of the speed that is detectable and produces a small calculation error when the vehicle 1 accelerates). When the vehicle 1 is decelerating, the switch flag is cleared if the wheel speeds Vfr, Vfl, Vrr, Vrl are greater than or equal to a deceleration upper limit value V1b (the minimum value of the speed that is detectable and produces a small calculation error when the vehicle 1 decelerates).

The switch flag is cleared both when the steering wheel turning angle θs is smaller than the fourth reference steering wheel turning angle θs4 and when the vehicle 1 is skidding. In the first embodiment, the fourth reference steering wheel turning angle θs4 is set to the value equal to the first reference steering wheel turning angle θs1. The acceleration upper limit value V1a is set to a value smaller than the upper limit value V1 and the deceleration upper limit value V1b is set to the value equal to the upper limit value V1.

Figure 6:
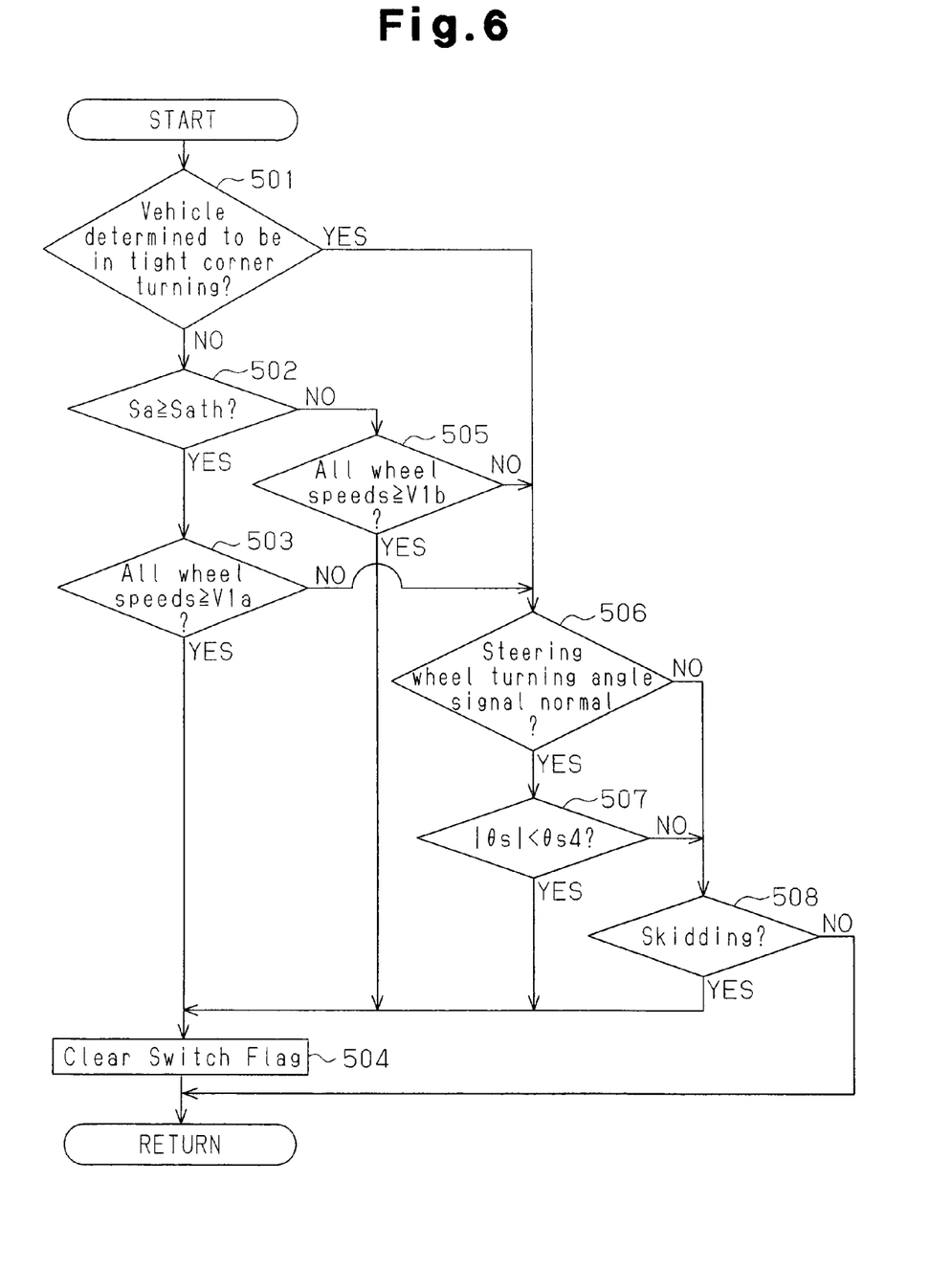
FIG. 6 is a flowchart representing a determining procedure for determining whether to cancel the tight corner control.

The tight corner control cancellation determining procedure performed by the ECU 13 will hereafter be explained in detail with reference to the flowchart of FIG. 6.

First, it is determined whether the vehicle 1 is turning by a turning radius smaller than or equal to the aforementioned maximum radius (S501). The determination of step S501 is carried out in the same manner as the above-described determination of step S103b. If it is determined that the vehicle 1 is not turning by a turning radius smaller than or equal to the maximum radius (S501: NO), that is, if the switch flag is not set in step S103b, it is determined whether the accelerator pedal depression amount Sa is greater than or equal to a predetermined accelerator pedal depression amount Sath (step S502). If the accelerator pedal depression amount Sa is greater than or equal to the accelerator pedal depression amount Sath (step S502: YES), that is, if the vehicle 1 is accelerating, it is determined whether the wheel speeds Vfr, Vfl, Vrr, Vrl are greater than or equal to the acceleration upper limit value V1a (S503).

If the wheel speeds Vfr, Vfl, Vrr, Vrl are greater than or equal to the acceleration upper limit value V1a (S503: YES), the switch flag is cleared (S504). If the accelerator pedal depression amount Sa is smaller than the predetermined accelerator pedal depression amount Sath (S502: NO), or if the vehicle 1 is decelerating, it is determined whether the wheel speeds Vfr, Vfl, Vrr, Vrl are greater than or equal to the deceleration upper limit value V1b (S505). If the wheel speeds Vfr, Vfl, Vrr, Vrl are greater than or equal to the deceleration upper limit value V1b (S505: YES), the switch flag is cleared (S504).

The ECU 13 determines whether the steering wheel turning angle signal provided by the steering sensor 18 is normal (S506) if it is determined that the vehicle 1 is turning by a turning radius smaller than or equal to a predetermined turning radius (S501: YES), if the wheel speeds Vfr, Vfl, Vrr, Vrl are smaller than the acceleration upper limit value V1a (S503: NO), or if the wheel speeds Vfr, Vfl, Vrr, Vrl are smaller than the deceleration upper limit value Vlb (S505: NO). If the steering wheel turning angle signal is normal (S506: YES), it is determined whether the absolute value of the steering wheel turning angle θs is smaller than the fourth reference steering wheel turning angle θs4 (S507). If the absolute value of the steering wheel turning angle θs is smaller than the fourth reference steering wheel turning angle θs4 (S507: YES), the switch flag is cleared (S504) and the cancellation determining procedure is ended.

If the steering wheel turning angle signal is not normal (S506: NO) or if the absolute value of the steering wheel turning angle θs is greater than or equal to the fourth reference steering wheel turning angle θs4 (S507: NO), it is determined whether the vehicle 1 is skidding (S508).

In step S508, determination similar to that of step S102, which has been described above, is carried out. If the vehicle 1 is skidding (S508: YES), or if the inhibition flag has been set in step S102, step S504 of the cancellation determining procedure is performed and the switch flag is cleared. If the vehicle 1 is not skidding (S508: NO), or if the inhibition flag has not been set in step S102, the cancellation determining procedure is ended without clearing the switch flag.

The first embodiment has the following advantages.

(1) If the turning radius calculated based on the wheel speeds Vfr, Vfl, Vrr, Vrl is smaller than or equal to the maximum value of the turning radius at which the tight corner braking phenomenon may be caused, the tight corner control is performed. If the vehicle speed V is smaller than the upper limit value V1 of the range of the vehicle speed corresponding to the starting state of the vehicle 1 and the steering wheel turning angle θs of the steering wheel 11 is greater than or equal to the reference steering wheel turning angle θs1 at which the tight corner braking phenomenon may occur, the tight corner control is carried out. Accordingly, if, for example, the steering wheel 11 is fully steered to the steering end when the vehicle 1 is in a stopped state and the vehicle 1 is started, the tight corner braking phenomenon is suppressed quickly.

If it is detected that the vehicle 1 is skidding based on the wheel speeds Vfr, Vfl, Vrr, Vrl, the tight corner control is not performed even if the vehicle speed V is smaller than the upper limit value V1 and the steering wheel turning angle θs is greater than or equal to the reference steering wheel turning angle θs1. Accordingly, for example, in the case where the steering wheel 11 is fully steered to the steering end when the vehicle 1 is not moving and then the vehicle 1 is started on a road surface with a low friction coefficient such as an icy road surface, the tight corner control is not executed with the vehicle 1 skidding. As a result, sufficient torque is transmitted to the rear wheels 10r so that the traction performance of the vehicle 1 is improved.

(2) In general, if the steering wheel turning angle θs of the steering wheel 11 is within the angle corresponding to one rotation of the steering wheel (−180° to +180°), the steering wheel turning angle θs is detected accurately by the steering sensor 18. However, in some cases, the engine 2 is started after it is stopped with the steering wheel 11 turned by the steering wheel turning angle exceeding the steering wheel turning angle corresponding to one rotation or after the engine 2 is stopped and then the steering wheel 11 is turned by the steering wheel turning angle exceeding the value corresponding to one rotation. If the engine 2 is started with the steering wheel 11 turned by the steering wheel turning angle exceeding the value corresponding to one rotation, it is likely that an erroneous steering wheel turning angle signal is provided by the steering sensor 18. However, in the first embodiment, the tight corner control is performed when it is determined that the current state corresponds to the state immediately after IG ON. As a result, even if, for example, the engine 2 is started when the steering wheel 11 is turned to the steering end and the vehicle 1 is started, the tight corner braking phenomenon is suppressed.

(3) When the vehicle 1 is in a starting state, a difference of the wheel speeds may easily occur. In this case, the turning radius may not be accurately calculated from the wheel speeds Vfr, Vfl, Vrr, Vrl while the vehicle 1 is starting. As a result, in this state, an erroneous determination that the vehicle 1 is proceeding linearly may be brought about based on an erroneous turning radius, despite the fact that the vehicle 1 is turning. In the first embodiment, if the wheel speeds Vfr, Vfl, Vrr, Vrl are smaller than the upper limit value V1 (the acceleration upper limit value V1a or the deceleration upper limit value V1b), cancellation of the tight corner control based on the determination of the turning radius is inhibited. This prevents the tight corner control from being erroneously canceled based on the erroneous determination that the vehicle 1 is proceeding linearly. The tight corner braking phenomenon is thus reliably suppressed.

(4) In the tight corner control cancellation determining procedure carried out when the vehicle 1 is accelerating, the switch flag is cleared if the vehicle 1 is not turning by the turning radius smaller than or equal to the maximum radius and the wheel speeds Vfr, Vfl, Vrr, Vrl are greater than or equal to the acceleration upper limit value V1a. In the tight corner control cancellation determining procedure when the vehicle 1 is decelerating, the switch flag is cleared if the vehicle 1 is not turning by the turning radius smaller than or equal to the maximum radius and the wheel speeds Vfr, Vfl, Vrr, Vrl are greater than or equal to the deceleration upper limit value V1b. In general, the wheel speed that is detectable by the steering sensor 18 and produces a small calculation error when the vehicle 1 accelerates is different from the corresponding value when the vehicle 1 decelerates. Accordingly, by setting different threshold values for the wheel speeds Vfr, Vfl, Vrr, Vrl depending on whether the vehicle 1 is accelerating or decelerating, it is further accurately determined whether to cancel the tight corner control.

(5) In the determination of the turning state of the vehicle 1, it is determined that the vehicle 1 is turning if the steering wheel turning angle θs is smaller than or equal to the second reference steering wheel turning angle θs2. In this manner, accurate determination is provided compared to the case in which the turning state is determined based only on the turning radius.

(6) If it is determined that the vehicle 1 is skidding in the determination of the turning state of the vehicle 1, the determination that the vehicle 1 is turning by the control radius is not made. The tight corner control is thus not executed when the vehicle 1 is skidding, preventing the traction performance from being lowered.

(7) If it is determined that the vehicle 1 is traveling at a speed greater than or equal to the seventh reference wheel speed V7 in the determination of the turning state of the vehicle 1, the determination that the vehicle 1 is turning by the control radius is not made. This suppresses the tight corner control when the vehicle 1 runs at the speed greater than or equal to the seventh reference wheel speed V7. This prevents the behavior of the vehicle 1 from being disturbed.

Second Embodiment

A second embodiment of the present invention will now be described with reference to FIG. 7.

Figure 7:
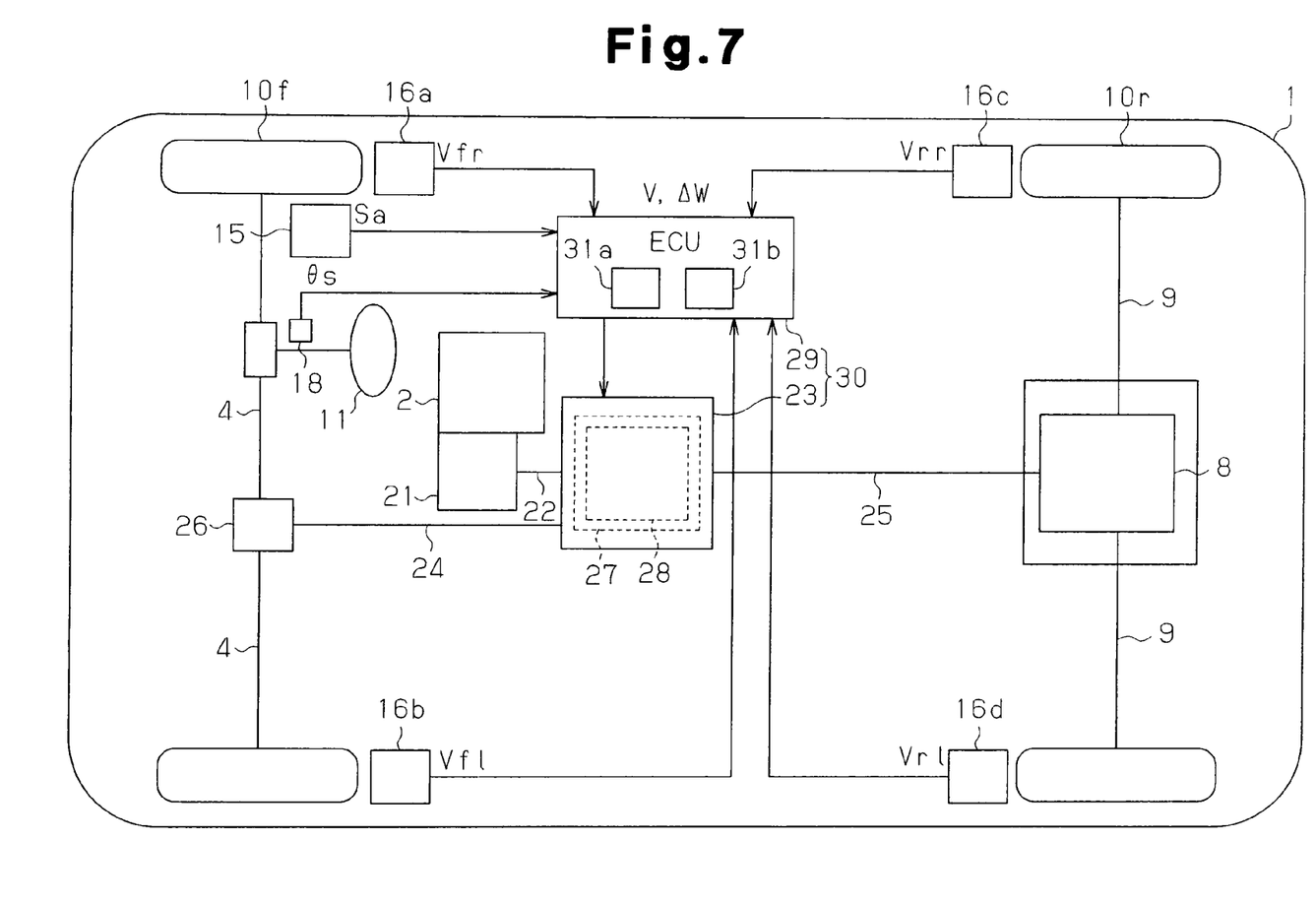
FIG. 7 is a diagram showing the construction of a four-wheel-drive vehicle having a limited slip differential.

For the illustrative purposes, same or like reference numerals are given to components in FIG. 7 that are the same as or like corresponding components of the first embodiment and explanation of these components is omitted.

As illustrated in FIG. 7, a transmission 21 is incorporated in the engine 2. A transfer 23 is connected to the transmission 21 through an input shaft 22. A first propeller shaft 24 functioning as a first driveshaft and a second propeller shaft 25 functioning as a second driveshaft are connected to the transfer 23.

The first propeller shaft 24 is connected to a pair of front axles 4 through a front differential 26. The second propeller shaft 25 is connected to a pair of rear axles 9 through a rear differential 8. Torque produced by the engine 2 is transmitted from the transmission 21 to the transfer 23 through the input shaft 22. The torque of the engine 2 that is transmitted to the transfer 23 is transmitted to the front wheels 10f through the first propeller shaft 24, the front differential 26, and the front axles 4 and to the rear wheels 10r through the second propeller shaft 25, the rear differential 8, and the rear axles 9.

The transfer 23 includes a center differential 27 that permits differential motion of the first propeller shaft 24 and the second propeller shaft 25. The center differential 27 functions as a torque distribution mechanism that distributes the torque transmitted through the input shaft 22 to the first and second propeller shafts 24, 25 in accordance with the differential motion. A differential limiting mechanism 28, which is formed by an electromagnetic clutch, is provided in the center differential 27. The friction engagement force of the differential limiting mechanism 28 changes in correspondence with change of the amount of the electric current supplied to an electromagnetic coil of the differential limiting mechanism 28. The differential limiting force of the differential limiting mechanism 28 limits the differential motion between the first propeller shaft 24 and the second propeller shaft 25.

An ECU 29 functioning as a control device is connected to the transfer 23. The ECU 29 regulates the differential limiting force of the differential limiting mechanism 28 by controlling operation of the differential limiting mechanism 28 through supply of a drive electric current to the electromagnetic clutch of the differential limiting mechanism 28 in accordance with the traveling state of the vehicle 1. The center differential 27, the differential limiting mechanism 28, and the ECU 29 configure a limited slip differential 30.

An accelerator pedal position sensor 15 and wheel speed sensors 16a to 16d are connected to the ECU 29. The ECU 29 calculates the vehicle speed V and the wheel speed difference ΔW between the front wheels 10f and the rear wheels 10r based on the wheel speeds Vfr, Vfl, Vrr, Vrl detected by the wheel speed sensors 16a to 16d. The ECU 29 obtains the control target of the differential limiting force of the differential limiting mechanism 28 using the vehicle speed V and the accelerator pedal depression amount Sa.

Specifically, the ECU 29 has a normal map 31a. When given a vehicle speed V and an accelerator pedal depression amount Sa, the normal map 31a provides a previously set target differential limiting force that corresponds to the vehicle speed V and the accelerator pedal depression amount S. According to the normal map 31a, as the vehicle V becomes smaller and as the accelerator pedal depression amount Sa becomes greater, the target differential limiting force becomes greater.

If the differential limiting force of the differential limiting mechanism 28 is set to an intense level when the vehicle 1 having the limited slip differential 30 turns by a small turning radius, the above-described tight corner braking phenomenon may occur. To solve this problem, if the turning radius of the vehicle 1 is smaller than or equal to the maximum value (which corresponds to the aforementioned maximum radius) of the turning radius that may cause the tight corner braking phenomenon, the ECU 29 performs the tight corner control in such a manner as to decrease the differential limiting force compared to a case in which the turning radius of the vehicle 1 is greater than the maximum value.

Specifically, the ECU 29 includes a tight corner map 31b in addition to the normal map 31a. When given a vehicle speed V and an accelerator pedal depression amount Sa, the tight corner map 31b provides a previously set target differential limiting force that corresponds to the vehicle speed V and the accelerator pedal depression amount Sa. Also according to the tight corner map 31b, as the vehicle speed V becomes lower and as the accelerator pedal depression amount Sa becomes greater, the target differential limiting force becomes greater. The tight corner map 31b sets a smaller differential limiting force than the normal map 31a for a common vehicle speed V and a common accelerator pedal depression amount Sa.

In the tight corner control, the ECU 29 sets the target differential limiting force with reference to the tight corner map 31b. In this manner, the ECU 29 reduces the differential limiting force to suppress the tight corner braking phenomenon. In contrast to the tight corner control, the control mode in which the target differential limiting force is set with reference to the normal map 31a is referred to as normal control.

Like the ECU 13 of the first embodiment, the ECU 29 switches the control modes based on the steering wheel turning angle θs provided by the steering sensor 18.

The second embodiment, which has been described above, has advantages equivalent to the advantages of the first embodiment.

The present invention may be embodied in the following other embodiments.

In each of the illustrated embodiments, determination of whether to switch the control modes based on the turning radius of the vehicle 1 is carried out if at least one of the wheel speeds Vfr, Vfl, Vrr, Vrl is greater than the upper limit value V1 (S301: NO). However, the determination may be performed if all of the wheel speeds Vfr, Vfl, Vrr, Vrl are greater than the upper limit value V1. Alternatively, the determination may be carried out if all of the wheel speeds Vfr, Vfl, Vrr, Vrl are smaller than the first reference wheel speed VH1.

In the illustrated embodiments, it is determined that the vehicle speed V is smaller than the upper limit value V1 if all of the wheel speeds Vfr, Vfl, Vrr, Vrl are smaller than the upper limit value V1. However, it may be determined that the vehicle speed V is smaller than the upper limit value V1 if the average of the wheel speeds Vfr, Vfl, Vrr, Vrl is smaller than the upper limit value V1.

Although the accelerating/decelerating state of the vehicle 1 is determined based on the accelerator pedal depression amount Sa, the accelerating/decelerating state of the vehicle 1 may be determined using a braking signal. Alternatively, an acceleration sensor may be mounted in the vehicle 1 so that the acceleration of the vehicle 1 is detected directly by the sensor.

Figure 5:
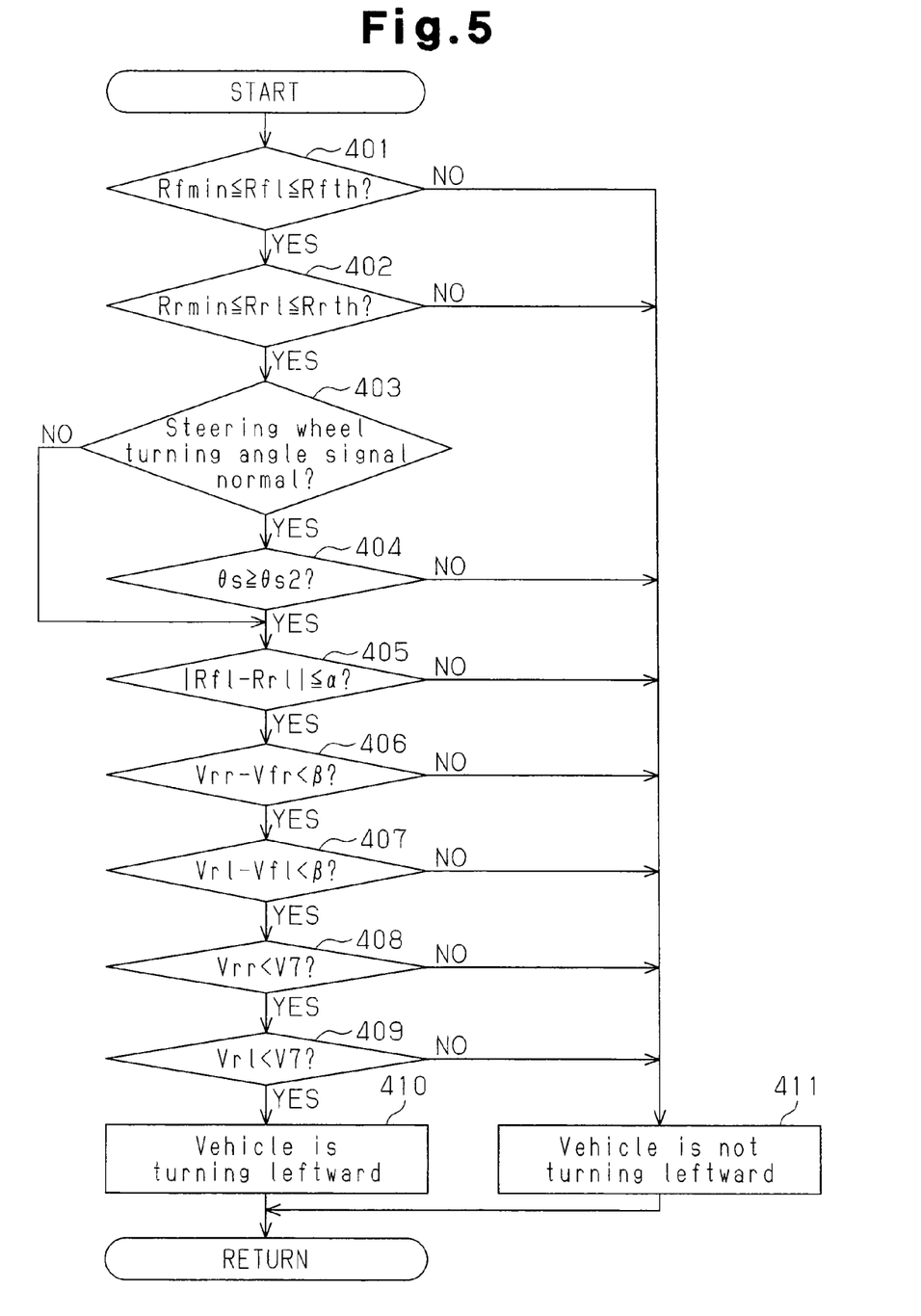
FIG. 5 is a flowchart representing a vehicle turning state determining procedure.

In the illustrated embodiments, the determination of whether the vehicle 1 is turning by the control radius involves, in addition to the determination using the turning radius, the determination about the steering wheel turning angle θs, the determination of whether the vehicle 1 is skidding, and the determination about the traveling speed of the vehicle 1 (steps S404 to S409 of FIG. 5). However, as long as at least the determination using the turning radius is carried out, not all of the aforementioned determinations needs to be performed.

In the illustrated embodiments, it is determined whether the vehicle 1 is skidding based on the relationship of the wheel speed difference among the wheel speeds Vfr, Vfl, Vrr, Vrl (steps S202 to S205, S207 to S210). However, it may be determined whether the vehicle 1 is skidding based on any other suitable parameter such as a yaw rate.

In the determination of whether to switch to the tight corner control in the illustrated embodiments, the upper limit value V1 is set to the wheel speed that is detectable by the wheel speed sensors 16a to 16d and at which the wheel speed sensors 16a to 16d produce only a small calculation error when the vehicle 1 decelerates. However, the upper limit value V1 may be set to the wheel speed that is detectable by the wheel speed sensors 16a to 16d and at which the wheel speed sensors 16a to 16d produce only a small calculation error when the vehicle 1 accelerates.

Alternatively, as in the case of the determination of whether to cancel the tight corner control, the upper limit value V1 may be set to different values depending on whether the vehicle 1 is in the accelerating state or the decelerating state.

In the determination of whether to cancel the tight corner control in the illustrated embodiments, the first reference wheel speed VH1 is set to different values depending on whether the vehicle 1 is in the accelerating state or the decelerating state. However, the first reference wheel speed VH1 may be set to the same value for the accelerating state and the decelerating state.

Although the first to fourth reference steering wheel turning angles θs1 to θs4 are set to the common value, the second reference steering wheel turning angle θs2 and the third reference steering wheel turning angle θs3 may be set to different values depending on whether the vehicle 1 turns leftward or rightward. Further, to provide the steering sensor 18 with hysteresis characteristics, the fourth reference steering wheel turning angle θs4 may be set to a value different from the first reference steering wheel turning angle θs1.

Although the tight corner control is performed in the state immediately after IG ON in the illustrated embodiments, the tight corner control does not necessarily have to be carried out in this state.

In the first embodiment, the target torque is calculated based on the vehicle speed V, the wheel speed difference ΔW, and the accelerator pedal depression amount Sa. In the second embodiment, the target differential limiting force is calculated based on the vehicle speed V and the accelerator pedal depression amount Sa. However, the target torque or the target differential limiting force may be obtained using any suitable parameters.

In the first embodiment, the present invention is used in, by way of example, the drive force transmission apparatus of the vehicle 1 in which the front wheels 10f are the main drive wheels. However, the invention may be employed in a drive force transmission apparatus of a vehicle in which the rear wheels 10r are the main drive wheels.

Therefore, the present examples and embodiments are to be considered as illustrative and not restrictive and the invention is not to be limited to the details given herein, but may be modified within the scope and equivalence of the appended claims.

What is claimed is:

1. A drive force transmission apparatus employed in a four-wheel-drive vehicle having main drive wheels, to which torque of a drive source is constantly transmitted, and auxiliary drive wheels, to which the torque of the drive source is transmitted when needed according to a state of the vehicle, the apparatus comprising:

a torque coupling that is arranged between the drive source and the auxiliary drive wheels that is configured to change a capacity of torque transmission to the auxiliary drive wheels a steering sensor connected to a steering wheel that steers the vehicle, the steering sensor detecting the steering wheel turning angle; and a control device that controls operation of the torque coupling, wherein the control device calculates a turning radius of the vehicle based on speeds of the main drive wheels and the auxiliary drive wheels, wherein, if the calculated turning radius is smaller than or equal to a maximum value of a turning radius at which a tight corner braking phenomenon can occur, the control device performs tight corner control in which the torque transmission capacity is decreased compared to a case in which the calculated turning radius of the vehicle is greater than the maximum value of the turning radius, wherein, when determining that the vehicle is not skidding based on the speeds of the main drive wheels and the auxiliary drive wheels, the control device executes the tight corner control if a speed of the vehicle is less than an upper limit value of a vehicle speed range corresponding to a starting state of the vehicle, and the steering wheel turning angle of the steering wheel is greater than or equal to a minimum value of a steering wheel turning angle at which the tight corner braking phenomenon can occur, and wherein, when determining that the vehicle is skidding based on the speeds of the main drive wheels and the auxiliary drive wheels, the control device inhibits the tight corner control even if the vehicle speed is less than the upper limit value, and the steering wheel turning angle is greater than or equal to the minimum value of the steering wheel turning angle at which the tight corner braking phenomenon can occur;

and wherein the upper limit value is set to different values depending on whether the vehicle is accelerating or decelerating.

2. The drive force transmission apparatus according to claim 1, wherein, when the drive source is in a starting state, the control device performs the tight corner control regardless of the steering wheel turning angle.

3. The drive force transmission apparatus according to claim 1, wherein the control device determines that the vehicle is skidding when
the speed of at least one of the main drive wheels is greater than or equal to a reference wheel speed V2, and
the speed of at least one of auxiliary drive wheels is smaller than a reference wheel speed V3.

4. A control method of a drive force transmission apparatus employed in a four-wheel-drive vehicle having main drive wheels, to which torque of a drive source is constantly transmitted, and auxiliary drive wheels, to which the torque of the drive source is transmitted when needed according to a state of the vehicle, the apparatus including a torque coupling that is arranged between the drive source and the auxiliary drive wheels and that is configured to change a capacity of torque transmission to the auxiliary drive wheels, a steering sensor connected to a steering wheel that steers the vehicle, and a control device that controls operation of the torque coupling, the method comprising:
detecting a steering wheel turning angle via the steering sensor;
calculating a turning radius of the vehicle based on speeds of the main drive wheels and the auxiliary drive wheels;
if the calculated turning radius is smaller than or equal to a maximum value of a turning radius at which a tight corner braking phenomenon can occur, performing tight corner control in which the torque transmission capacity is decreased compared to a case in which the calculated turning radius of the vehicle is greater than the maximum value of the turning radius;
determining whether the vehicle is skidding based on the speeds of the main drive wheels and the auxiliary drive wheels;
when it is determined that the vehicle is not skidding, executing the tight corner control if
a speed of the vehicle is less than an upper limit value of a vehicle speed range corresponding to a starting state of the vehicle, and
the steering wheel turning angle of the steering wheel is greater than or equal to a minimum value of a steering wheel turning angle at which the tight corner braking phenomenon can occur; and
when it is determined that the vehicle is skidding, inhibiting the tight corner control even if
the vehicle speed is less than the upper limit value, and
the steering wheel turning angle is greater than or equal to the minimum value of the steering wheel turning angle at which the tight corner braking phenomenon can occur;
and
setting the upper limit value to different values depending on whether the vehicle is accelerating or decelerating.

5. The control method according to claim 4, further comprising determining that the vehicle is skidding when
the speed of at least one of the main drive wheels is greater than or equal to a reference wheel speed V2, and
the speed of at least one of auxiliary drive wheels is smaller than a reference wheel speed V3.

6. A limited slip differential comprising:
a torque distribution mechanism that distributes torque of a drive source of a four-wheel-drive vehicle to a first driveshaft connected to front wheels and a second driveshaft connected to rear wheels;
a differential limiting mechanism configured to limit differential motion between the first driveshaft and the second driveshaft;
a steering sensor connected to a steering wheel that steers the vehicle, the steering sensor detecting the steering wheel turning angle; and
a control device that controls operation of the differential limiting mechanism,
wherein the control device calculates a turning radius of the vehicle based on speeds of the main drive wheels and the auxiliary drive wheels,
wherein, if the calculated turning radius is smaller than or equal to a maximum value of a turning radius at which a tight corner braking phenomenon may occur, the control device performs tight corner control in which a differential limiting force of the differential limiting mechanism is decreased compared to a case in which the calculated turning radius of the vehicle is greater than the maximum value of the turning radius,
wherein, when determining that the vehicle is not skidding based on the speeds of the main drive wheels and the auxiliary drive wheels, the control device executes the tight corner control if
a speed of the vehicle is less than an upper limit value of a vehicle speed range corresponding to a starting state of the vehicle, and
the steering wheel turning angle of the steering wheel is greater than or equal to a minimum value of a steering wheel turning angle at which the tight corner braking phenomenon can occur, and
wherein, when determining that the vehicle is skidding based on the speeds of the main drive wheels and the auxiliary drive wheels, the control device inhibits the tight corner control even if
the vehicle speed is less than the upper limit value, and
the steering wheel turning angle is greater than or equal to the minimum value of the steering wheel turning angle at which the tight corner braking phenomenon can occur
and
wherein the upper limit value is set to different values depending on whether the vehicle is accelerating or decelerating.

7. The limited slip differential according to claim 6, wherein the control device determines that the vehicle is skidding when
the speed of at least one of the main drive wheels is greater than or equal to a reference wheel speed V2, and
the speed of at least one of auxiliary drive wheels is smaller than a reference wheel speed V3.

* * * * *